United States Patent
Tyagi et al.

(10) Patent No.: US 11,334,666 B2
(45) Date of Patent: May 17, 2022

(54) ATTACK KILL CHAIN GENERATION AND UTILIZATION FOR THREAT ANALYSIS

(71) Applicant: Qualys, Inc., Foster City, CA (US)

(72) Inventors: Ankur S. Tyagi, Foster City, CA (US); Mayuresh Vishwas Dani, Fremont, CA (US)

(73) Assignee: Qualys Inc., Foster City, CA (US)

( * ) Notice: Subject to any disclaimer, the term of this patent is extended or adjusted under 35 U.S.C. 154(b) by 0 days.

(21) Appl. No.: 16/384,543

(22) Filed: Apr. 15, 2019

(65) Prior Publication Data

US 2020/0327224 A1    Oct. 15, 2020

(51) Int. Cl.
 *G06F 21/55* (2013.01)

(52) U.S. Cl.
 CPC ...... *G06F 21/554* (2013.01); *G06F 2221/034* (2013.01)

(58) Field of Classification Search
 None
 See application file for complete search history.

(56) References Cited

U.S. PATENT DOCUMENTS

| | | | | |
|---|---|---|---|---|
| 10,356,119 B1 * | 7/2019 | Chang | | G06N 20/00 |
| 2010/0192226 A1 * | 7/2010 | Noel | | H04L 63/1425 726/23 |
| 2017/0223030 A1 * | 8/2017 | Merza | | H04L 63/1416 |
| 2018/0032724 A1 * | 2/2018 | Tang | | H04L 63/1425 |
| 2018/0084001 A1 * | 3/2018 | Hudis | | G06F 16/9024 |
| 2018/0248893 A1 * | 8/2018 | Israel | | G06N 5/025 |
| 2019/0081963 A1 * | 3/2019 | Waghorn | | H04L 63/1441 |
| 2019/0141058 A1 * | 5/2019 | Hassanzadeh | | H04L 63/0227 |
| 2019/0207969 A1 * | 7/2019 | Brown | | G06F 21/552 |
| 2019/0342307 A1 * | 11/2019 | Gamble | | H04L 63/1416 |

(Continued)

FOREIGN PATENT DOCUMENTS

CN    107483425 A  * 12/2017

OTHER PUBLICATIONS

Wikipedia, Tactics, Techniques and Procedures (TTP), https://en.wikipedia.org/wiki/Terrorist_Tactics,_Techniques,_and_Procedures, last updated Sep. 30, 2019.

(Continued)

*Primary Examiner* — Michael Pyzocha
(74) *Attorney, Agent, or Firm* — Baker & McKenzie LLP

(57) ABSTRACT

The present disclosure relates to methods, systems, and computer program products for generating an attack kill chain for threat analysis. The method comprises receiving a first security event captured by a first security operation associated with a computing device, and receiving a second security event captured by a second security operation associated with the computing device. The first security event and the second security event are associated with an attack campaign. The method further comprises mapping the first security event to first security data in an attack repository, and mapping the second security event to second security data in the attack repository. The method also comprises determining based on the mapping, one or more attack execution operations for executing the attack campaign associated with the first security event and the second security event. Additionally, the method sequences the one or more attack execution operations to form an attack kill chain.

20 Claims, 8 Drawing Sheets

(56) References Cited

U.S. PATENT DOCUMENTS

| | | | | |
|---|---|---|---|---|
| 2020/0143052 | A1* | 5/2020 | Mazumder | G06F 21/566 |
| 2020/0177615 | A1* | 6/2020 | Grabois | H04L 63/20 |
| 2020/0177636 | A1* | 6/2020 | Linn | H04L 63/1416 |
| 2020/0296117 | A1* | 9/2020 | Karpovsky | H04L 63/1483 |
| 2020/0314118 | A1* | 10/2020 | Levin | H04L 63/1466 |
| 2020/0314141 | A1* | 10/2020 | Vajipayajula | H04L 63/145 |

OTHER PUBLICATIONS

Azeria, Tactics, Techniquesand Procedures (TTP), https://azeria-labs.com/tactics-techniques-and-procedures-ttps/, 2017.

The Mitre Corporation, ATT&CK Matrix, Defines commonly known adversarial behavior (TTPs), https://attack.mitre.org/, 2015.

The Mitre Corporation, PRE-ATT&CK Matrix: Subset of ATT&CK Matrix focusing on TTPs related to steps taken "before" launching an attack, https://attack.mitre.org/matrices/pre/, 2015.

The Mitre Corporation, ATT&CK Matrix for Enterprise: Subset of ATT&CK Matrix focusing on TTPs related to steps taken "during" an attack, primarily targeting enterprise users, https://attack.mitre.org/matrices/enterprise/, 2015.

The Mitre Corporation, ATT&CK Matrix Matrices for Mobile: Subset of ATT&CK Matrix focusing on TTPs related to steps taken "during" an attack, primarily focusing on mobile users, https://attack.mitre.org/matrices/mobile/, 2015.

Wikipedia, Cyber Kill Chain: Refers to sequence of tactics used by adversaries to achieve a goal. Multiple definitions from different sources but we are following ATT&CK Matrix as it is the most verbose, https://en.wikipedia.org/wiki/Kill_chain#The_Cyber_Kill_Chain, last updated on Sep. 30, 2019.

Wikipedia, The Unified Kill Chain: Refers to sequence of tactics used by adversaries to achieve a goal. Multiple definitions from different sources but we are following ATT&CK Matrix as it is the most verbose, https://en.wikipedia.org/wiki/Kill_chain#The_Unified_Kill_Chain, last updated on Sep. 30, 2019.

* cited by examiner

```
                                    ┌─ 400
                                    ▼

┌─────────────────────────────────────────────────────────────┐
│  RECEIVING A FIRST SECURITY EVENT CAPTURED BY A FIRST       │
│  SECURITY OPERATION ASSOCIATED WITH A COMPUTING             │
│  DEVICE, AND A SECOND SECURITY EVENT CAPTURED BY A          │
│  SECOND SECURITY OPERATION ASSOCIATED WITH THE              │
│  COMPUTING DEVICE                                           │
│                            402                              │
└─────────────────────────────────────────────────────────────┘
                              │
                              ▼
┌─────────────────────────────────────────────────────────────┐
│  MAPPING THE FIRST SECURITY EVENT TO FIRST SECURITY         │
│  DATA IN AN ATTACK REPOSITORY, AND THE SECOND               │
│  SECURITY EVENT TO SECOND SECURITY DATA IN THE              │
│  ATTACK REPOSITORY                                          │
│                            404                              │
└─────────────────────────────────────────────────────────────┘
                              │
                              ▼
┌─────────────────────────────────────────────────────────────┐
│  DETERMINING, BASED ON THE MAPPING, ONE OR MORE             │
│  ATTACK EXECUTION OPERATIONS FOR EXECUTING ATTACK           │
│  CAMPAIGN ASSOCIATED WITH THE FIRST SECURITY EVENT          │
│  AND THE SECOND SECURITY EVENT                              │
│                            406                              │
└─────────────────────────────────────────────────────────────┘
                              │
                              ▼
┌─────────────────────────────────────────────────────────────┐
│  SEQUENCING THE ONE OR MORE ATTACK EXECUTION                │
│  OPERATIONS TO FORM AN ATTACK KILL CHAIN, THE ATTACK        │
│  KILL CHAIN INDICATING THE ONE OR MORE ATTACK               │
│  EXECUTION OPERATIONS FOR EXECUTING THE ATTACK              │
│  CAMPAIGN                                                   │
│                            408                              │
└─────────────────────────────────────────────────────────────┘
                              │
                              ▼
┌─────────────────────────────────────────────────────────────┐
│  INITIATING GENERATION OF A VISUAL REPRESENTATION OF        │
│  THE ATTACK KILL CHAIN, THE VISUAL REPRESENTATION           │
│  INDICATING A SEQUENCE OF THE ONE OR MORE ATTACK            │
│  EXECUTION OPERATIONS FOR EXECUTING THE ATTACK              │
│  CAMPAIGN                                                   │
│                            410                              │
└─────────────────────────────────────────────────────────────┘
```

FIG. 4

| Tactic 1 (e.g., Initial Access) | Tactic 2 (e.g., Execution) | Tactic 3 (e.g., Persistence) | Tactic 4 (e.g., Privilege Escalation) | Tactic 5 (e.g., Defense Evasion) | Tactic 6 (e.g., Credential Access) |
|---|---|---|---|---|---|
| T1190 | | | | | |
| | | | | | |
| | | | | | |

| Tactic 7 (e.g., Discovery) | Tactic 8 (e.g., Lateral Movement) | Tactic 9 (e.g., Collection) | Tactic 10 (e.g., Exfiltration) | Tactic 11 (e.g., Command and Control) |
|---|---|---|---|---|
| T1018 | T1210 | | | T1079 |
| T1046 | T1105 | | | T1026 |

FIG. 7

ATTACK KILL CHAIN GENERATION AND UTILIZATION FOR THREAT ANALYSIS

TECHNICAL FIELD

The present disclosure relates to methods and systems for generating an attack kill chain. More specifically, the present disclosure describes generating visualizations showing attack steps involved in a kill chain associated with an attack campaign and using the attack steps for threat analysis.

BACKGROUND

Many computer security products like Antiviruses, Web Application Firewalls, Intrusion Prevention Systems, and the like, protect computing systems from theft or damage to their hardware, software, or electronic data, as well as from disruption or misdirection of the services they provide. Computer security products usually generate security reports or logs that provide insight into the nature of an attack, who the attackers are, the time of the attack, as well as other relevant information associated with the attack. These security reports are an invaluable source of information for optimizing and/or generally improving security products to more beneficially deal with attacks on computing device assets.

A major challenge in the computer security industry is a lack of leveraging information from security reports and other data associated with security events from multiple and usually diverse security products. For instance, a given user of a computing system (either a standalone or distributed system) may have multiple security products that detect threat activity associated with an attack campaign on the computing system. The attack campaign may leave a digital footprint which can be captured in the multiple security reports generated by the security products associated with the computing system. Generally, each security report/log from each security product is generally used in isolation from security reports of the other security products associated with the computing system. This is undesirable as the collective security logs/reports from the different security products associated with the computing system may be describing a more insightful attack scenario than what individual security reports/logs in isolation may be describing.

Additionally, users of computer security products typically remediate only highly severe vulnerabilities while completely ignoring the ramifications of weakly protected assets associated with their computing systems. This is largely because users of computer security products do not have a holistic view of the origin and progression of a successful attack campaign on their computing systems' assets.

Moreover, most computer security products generally do not provide a feedback loop between security controls and remediation processes. This generally leads to a lack of an automated end-to-end validation and remediation cycle.

It would be desirable to address these issues.

SUMMARY

According to one aspect of the subject matter described in this disclosure, a method for generating an attack kill chain for threat analysis is presented. The method comprises receiving a first security event captured by a first security operation associated with a computing device, and receiving a second security event captured by a second security operation associated with the computing device. In one implementation, the first security event and the second security event are associated with an attack campaign. The method further comprises mapping the first security event to first security data in an attack repository, and mapping the second security event to second security data in the attack repository. The attack repository may comprise attack data captured from multiple computing devices associated with different entities. The method also comprises determining based on the mapping, one or more attack execution operations for executing the attack campaign associated with the first security event and the second security event. Additionally, the method sequences the one or more attack execution operations to form an attack kill chain. The attack kill chain, in one embodiment, indicates the one or more attack execution operations for executing the attack campaign associated with the first security event and the second security event. The method further initiates generation of a visual representation of the attack kill chain, the visual representation indicating a sequence of the one or more attack execution operations for executing the attack campaign associated with the first security event and the second security event.

Other implementations of one or more of these aspects include corresponding systems, apparatus, and computer programs, configured to perform the actions of the methods, encoded on computer storage devices.

These and other implementations may each optionally include one or more of the following features. The first security operation comprises one or more of: an infrastructure security operation; a cloud security operation; a compliance operation; a network security operation; and a software development operation. The first security event comprises a passive attack event comprising one or more security detections of reconnaissance activity for obtaining vulnerability information of the computing device. Additionally, the second security event can be an active attack event comprising one or more security detections associated with intrusion activity on the computing device. Moreover, the one or more attack execution operations are associated with the passive attack event and the active attack event. In one embodiment, the first security event comprises a security event log captured by an asset associated with the computing device, the security event log comprising one or more of: an antivirus log; a web application firewall log; and an intrusion prevention system log. The asset associated with the computing device can comprise one or more of a hardware resource, and a software resource of the computing device. Further, the attack repository is based on MITRE ATT&CK framework in some embodiments. Also, the visual representation of the attack kill chain can comprise one or more vertices representing the one or more attack execution operations. The one or more vertices can be organized to reflect an order of occurrence of the one or more attack execution operations within the attack campaign associated with the first security event and the second security event.

BRIEF DESCRIPTION OF THE DRAWINGS

The disclosure is illustrated by way of example, and not by way of limitation in the figures of the accompanying drawings in which like reference numerals are used to refer to similar elements. It is emphasized that various features may not be drawn to scale and the dimensions of various features may be arbitrarily increased or reduced for clarity of discussion. Further, some components may be omitted in certain figures for clarity of discussion.

FIG. 4 shows an example flowchart for generating an attack kill chain in accordance with some embodiments of this disclosure.

FIG. 7 shows an example mapping of detected security events to attack execution operations in an attack repository, in accordance with some embodiments of this disclosure.

DETAILED DESCRIPTION

Figure 1:
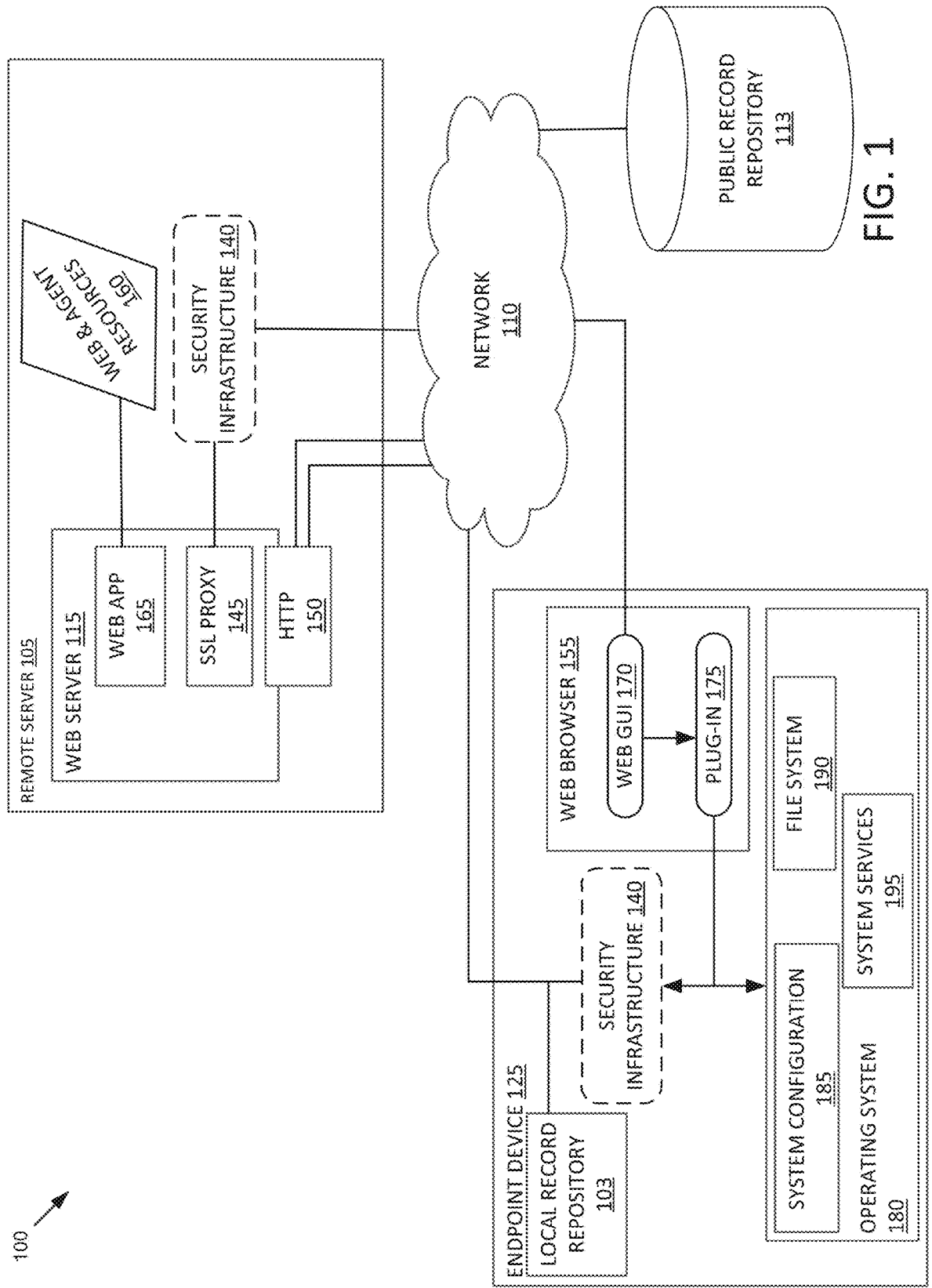
FIG. 1 shows a high level diagram of an example system for generating an attack kill chain and an asset remediation trend map, in accordance with some embodiments of this disclosure.

The present disclosure describes various techniques and systems for generating attack steps and remediation strategies associated with an attack campaign on a computing system. An attack campaign could comprise a collection of techniques and tactics used to execute an attack on a computing system. In one embodiment, tactics used to execute an attack campaign comprise a collection of techniques that are aligned to a particular phase within the attack campaign. Moreover, a technique used in an attack campaign could include an action that a threat-actor performs to achieve a specific goal.

In the computer security space, threat-actors or adversaries such as Advanced Persistent Threat (APT) groups generally execute attack execution operations for myriad reasons when attacking computing devices. Attack execution operations could comprise one or more techniques, tactics, and/or practices used a threat-actor to execute an attack campaign. As part of executing attack execution operations, threat-actors may seek vulnerabilities on computing devices, hold computing devices hostage via denial of service attacks, seek backdoor channels into computing devices to bypass normal authentication protocols, compromise computing devices using worms and keyloggers, eavesdrop, phish and spoof to obtain data, etc. Because of this, individuals and organizations generally have some form of computer security infrastructure that deal with threats posed by threat-actor activities.

Usually, most users adopt computer security infrastructure that combines many security features associated with one or more computer security products. The techniques disclosed herein facilitate leveraging data generated from one or more security features associated with one or more computer security products in a manner that provides a holistic or complete view into the content and context of an attack campaign executed against a computing system.

The techniques described herein advantageously facilitate mapping attack events associated with an attack campaign across a multitude of security products to security data in an attack repository to generate an attack kill chain. In one embodiment, an attack kill chain comprises data that provides insight into how the attack campaign was executed. This data could include steps used to execute the attack campaign. In some implementations, the attack repository from which the attack kill chain is generated may include attack data captured from multiple computing devices associated with different entities such as individuals, groups, and organizations.

Additionally, the techniques discussed herein allow users to quantify vulnerabilities associated with their computing systems to further allow automatic adaptation of remediation strategies that appropriately account for and remediate against a given attack campaign. More specifically, the techniques discussed herein enable users to generate an asset remediation trend map that outlines steps and strategies that can be used to remediate and prevent the attack campaign from subsequently reoccurring.

System Environment

Illustrated in FIG. 1 is a high level diagram of an example system 100 for executing the principles disclosed herein. In the illustrated implementation, the system 100 may include a remote server 105 coupled to a network 110. The system 100 may also include an exemplary endpoint device 125 and a public record repository 113 communicatively coupled via the network 110. While a single remote server 105 is illustrated, the disclosed principles and techniques could be expanded to include multiple remote servers. Similarly, while a single endpoint device 125 is illustrated, the disclosed principles and techniques are expandable to multiple endpoint devices.

In some embodiments, the remote server 105 may include a computing device such as a mainframe server, a content server, a communication server, a laptop computer, a desktop computer, a handheld computing device, a smart phone, a smart watch, a wearable device, a touch screen, a biometric device, a video processing device, an audio processing device, a virtual machine, a cloud-based computing solution and/or service, and/or the like. The remote server 105 may include a plurality of computing devices configured to communicate with one another and/or implement the techniques described herein.

Figure 2:
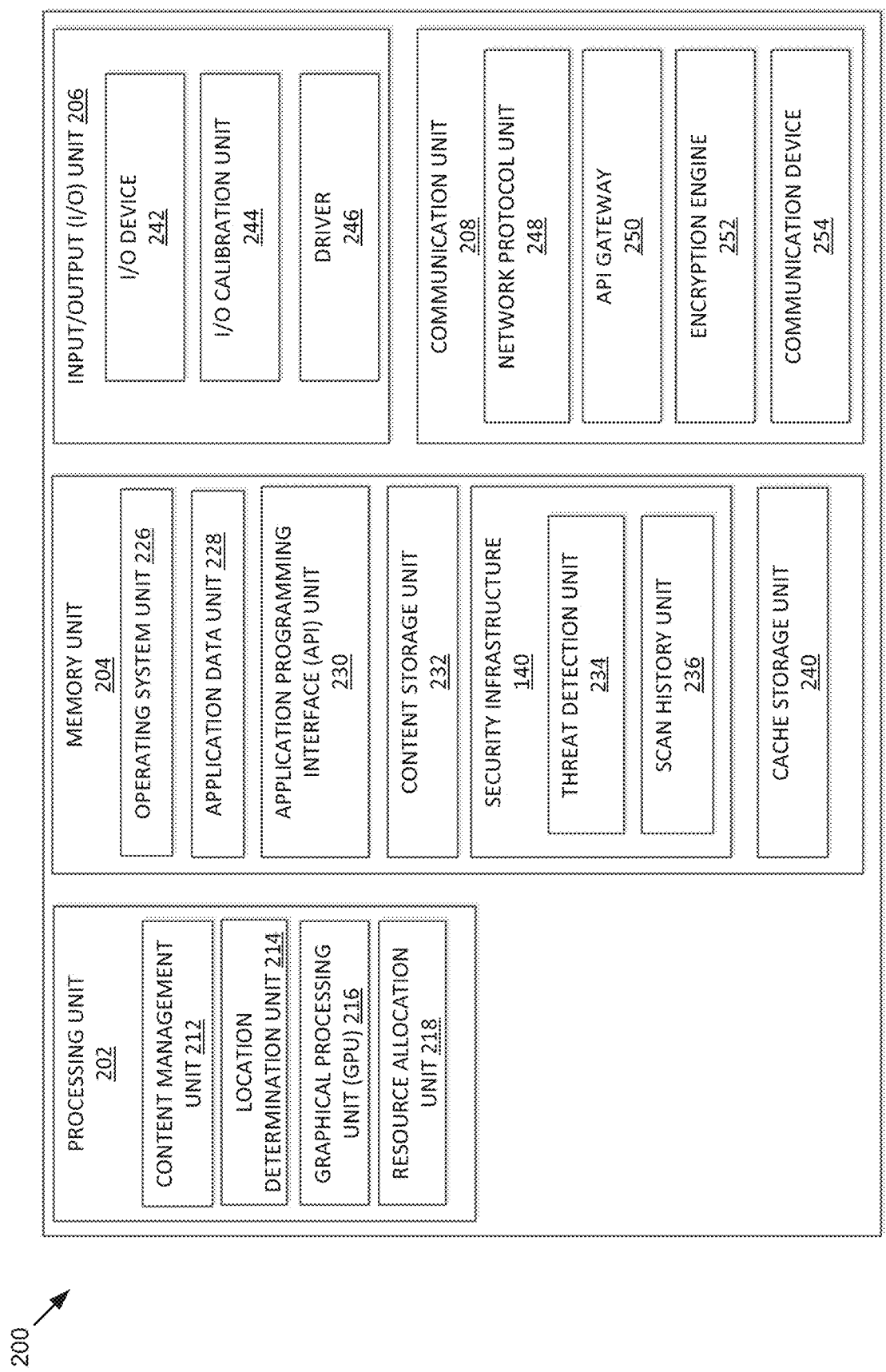
FIG. 2 is a functional block diagram of a computing environment, in accordance with some embodiments of this disclosure.
Figure 3:
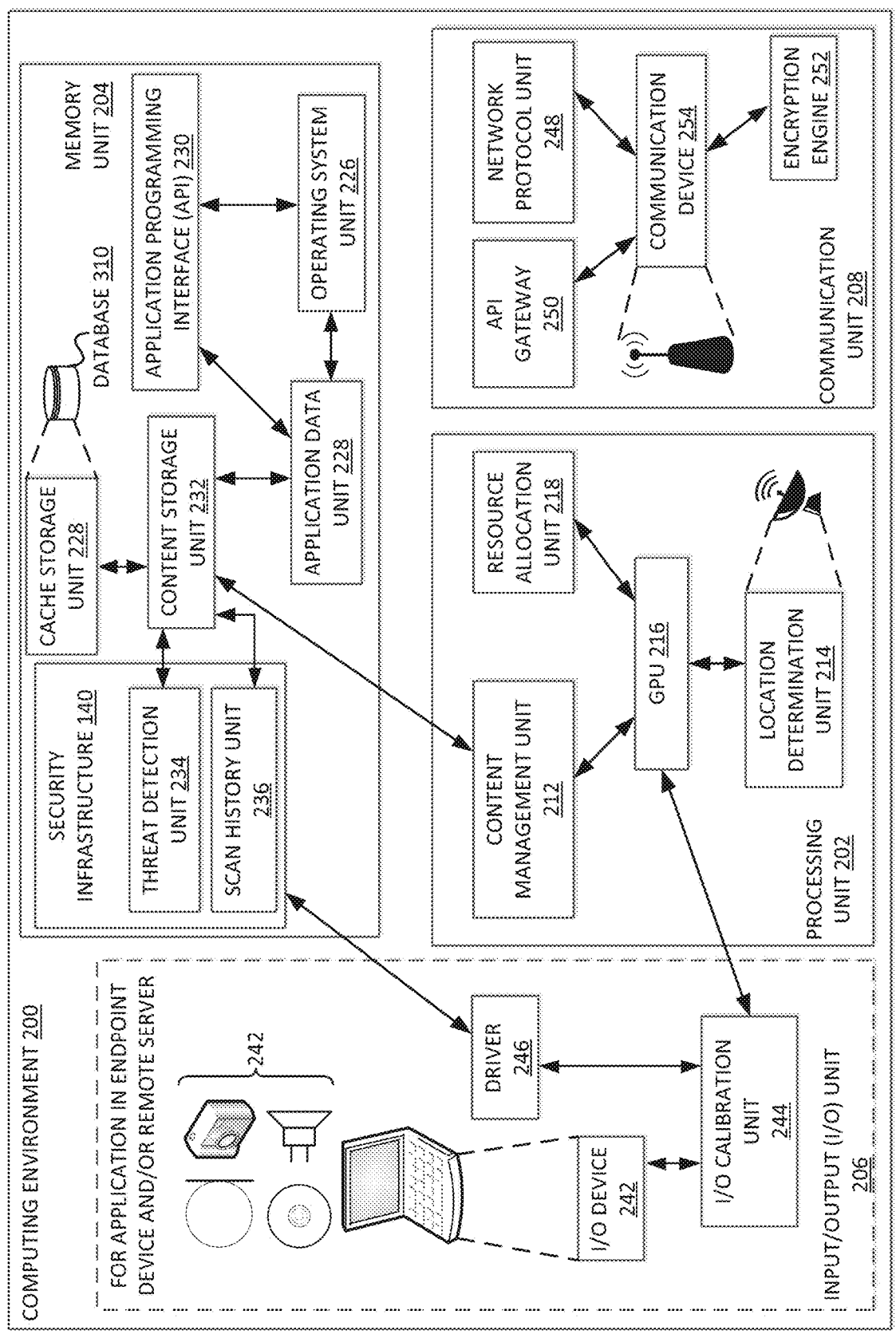
FIG. 3 is a detailed system diagram of a computing environment, in accordance with some embodiments of this disclosure.

In some instances, the remote server 105 may include various elements of a computing environment as described herein (e.g., computing environment 200 of FIG. 2 and/or FIG. 3). For example, the remote server 105 may include processing unit 202, a memory unit 204, an input/output (I/O) unit 206, and/or a communication unit 208. The remote server 105 may further include subunits and/or other instances as described herein for performing operations associated with malware detection and remediation. A user (e.g., network administrator) may operate the remote server 105 either locally or remotely.

Further, the remote server 105 may include a web server 115, security infrastructure 140, and a web and agent resources 160. The web server 115, the security infrastructure 140 and the web and agent resources 160 are coupled to each other and to the network 110 via one or more signal lines. The one or more signal lines may be a wired and/or wireless connection.

The web server 115 may include a secure socket layer (SSL) proxy 145 for establishing HTTP-based connectivity 150 between the remote server 105 and other devices coupled to the network 110. Other forms of secure connection techniques, such as encryption, may be employed on the web server 115 and across the network 110. Additionally, the web server 115 may deliver artifacts (e.g., binary code, instructions, etc.) to the security infrastructure 140 either directly via the SSL proxy 145 and/or via the network 110.

Additionally, the web and agent resources 160 of the remote server 105 may be provided to the endpoint device 125 via the web app 165 on the web server 115. The web and agent resources 160 may be used to render a web-based graphical interface (GUI) 170 via the browser 155 running on the endpoint device 125.

The security infrastructure 140 may either be on the remote server 105 and/or on the endpoint device 125. Security infrastructure 140 may include one or more computer security products such as access control software, anti-keyloggers, anti-malware, anti-spyware, anti-subversion software, anti-tamper software, antivirus software, cryptographic software, computer-aided dispatch (CAD), Firewall (web or otherwise), Intrusion detection systems (IDS), Intrusion prevention systems (IPS), log management software, records management software, Sandboxes (e.g., a secure environment in which various computing processes may be executed), security information management software, security information and event management (SIEM) software, anti-theft software, parental control software, cloud-based security protection, and/or the like.

In some embodiments, security infrastructure 140 can determines whether scan data is indicative of malware and whether a report indicating that the endpoint device 125 is exposed to risks associated with malware. The report may include a listing of identified attributes, a count of identified attributes, a type of each identified attribute, an identification of each malware family and/or malware variant determined to be associated with the endpoint device 125, and/or one or more recommendations for addressing detected vulnerabilities. This record may be stored on the local record repository 103 and/or on the public record repository 113.

The security infrastructure 140 may be configured to execute security operations including preparedness operations such as processes for dealing with security incidents/breaches/compromises; detection and analysis operations such as identifying and investigating suspicious activity associated with security events; containment, eradication, and recovery operations including determining the nature of a security event; and post incident activity.

In some further embodiments, the security infrastructure 140 may access an operating system 180 of the endpoint device 125 in order to execute security operations as discussed elsewhere in this disclosure. For instance, the security infrastructure 140 may gain access into the operating system in order to scan a security posture of the endpoint device 125 by scanning a system configuration 185, a file system 190, and/or system services 195 of the endpoint device 125. The plug-in 175 of the web browser 155 may provide needed downloads that facilitate operations executed by the operating system 180, the security infrastructure 140, and/or other applications running on the endpoint device 125.

The network 110 may include a plurality of networks. For instance, the network 110 may include any wired and/or wireless communication network that facilitates communication between the remote server 105, the public record repository 113, and the endpoint device 125. The network 110, in some instances, may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a laser-based network, and/or the like.

Returning to FIG. 1, the public record repository 113 may be one or more storage devices that store data, information and instructions used by the remote server 105 and the endpoint device 125. The stored information may include information about users, information about threat-actors, information about techniques, tactics and practices used by threat-actors to execute an attack campaign, suggestions for remediation against an attack campaign, and other computer security information from multiple computing devices. In one embodiment, the computer security information may be captured from computing devices from multiple different organizations and stored in the public record repository 113. In other embodiments, the computer security information stored in the public record repository 113 may be structured into a framework based on real-world observations of attacks on computing devices across the globe. In some instances, this framework can provide comprehensive methods that look into tools/resources/components used by threat-actors to execute an attack campaign on a computing system. Additionally, the framework could also enable mapping security events detected on computing devices to a combination of techniques, tactics, and practices within the public record repository 113. This can be used to determine techniques, tactics, and practices used by threat-actors to hide their attacks, stage their exploits, evade detection, leverage network weaknesses, etc. This framework, in some instances, is the MITRE ATT&CK framework where attacks are classified into discreet units to facilitate recognizing patterns associated with one or more attack campaigns on computing systems.

The one or more storage devices mentioned above in association with the public record repository 113 can be non-volatile memory or similar permanent storage device and media. For example, the one or more storage devices may include a hard disk drive, a floppy disk drive, a CD-ROM device, a DVD-ROM device, a DVD-RAM device, a DVD-RW device, a flash memory device, solid state media, or some other mass storage device known in the art for storing information on a more permanent basis.

While the public record repository 113 is shown as coupled to the remote server 105 and the endpoint device 125 via the network 110, the data in the public record repository 113 may be replicated, in some embodiments, on the remote server 105 and/or the endpoint device 125. That is to say that a local copy of the data in the public record repository 113 may be stored on the remote server 105 and/or the endpoint device 125. This local copy may be synched with the public record repository 113 so that when there are any changes to the information in the public record repository 113, the local copy is also accordingly updated in real-time or in pseudo-real-time to be consistent with the information in the public record repository 113.

Turning back to FIG. 1, the endpoint device 125 may be a handheld computing device, a smart phone, a tablet, a laptop computer, a desktop computer, a personal digital assistant (PDA), a smart watch, a wearable device, a biometric device, an implanted device, a camera, a video recorder, an audio recorder, a touchscreen, a computer server, a virtual server, a virtual machine, and/or a video communication server. In some embodiments, the endpoint device 125 may include a plurality of computing devices configured to communicate with one another and/or implement the techniques described herein.

The local record repository 103, shown in association with the endpoint device 125, may be one or more storage devices that store data, information, and instructions used by the endpoint device 125 and/or other devices coupled to the network 110. The stored information may include various logs/records associated with captured security data/security events by the security infrastructure 140. For example, the various reports, logs, data, etc., generated by the one or more security products of the security infrastructure 140 may be stored in the local record repository.

The one or more storage de-ices discussed above in association with the local record repository 103 can be non-volatile memory or similar permanent storage device and media. For example, the one or more storage devices may include a hard disk drive, a floppy disk drive, a CD-ROM device, a DVD-ROM device, a DVD-RAM device, a DVD-RW device, a flash memory device, solid state media, or some other mass storage device known in the art for storing information on a more permanent basis.

The other elements of the endpoint device 125 are discussed in association with the computing environment 200 of FIG. 2 and/or FIG. 3. For example, elements such as a processing unit 202, a memory unit 204, an input/output (I/O) unit 206, and/or a communication unit 208 may execute one or more of the modules of endpoint device 125 and/or one or more elements of the remote server 105 shown in FIG. 1. The endpoint device 125 may also include subunits and/or other computing instances as described herein for performing operations associated with malware detection, malware remediation, and/or malware simulation.

FIG. 2 and FIG. 3 illustrate exemplary functional and system diagrams of a computing environment 200, according to some embodiments of this disclosure, for performing the operations described herein. Specifically, FIG. 2 provides a functional block diagram of the computing environment 200, whereas FIG. 3 provides a detailed system diagram of the computing environment 200.

As seen in FIG. 2 and FIG. 3, the computing environment 200 may include a processing unit 202, a memory unit 204, an I/O unit 206, and a communication unit 208. The processing unit 202, the memory unit 204, the I/O unit 206, and the communication unit 208 may include one or more subunits for performing operations described herein. Additionally, each unit and/or subunit may be operatively and/or otherwise communicatively coupled with each other so as to facilitate the operations described herein. The computing environment 200 including any of its units and/or subunits may include general hardware, specifically-purposed hardware, and/or software.

Importantly, the computing environment 200 and any units and/or subunits of FIG. 2 and/or FIG. 3 may be included in one or mere elements of system 100 as described with reference to FIG. 1. For example, one or more elements (e.g., units and/or subunits) of the computing environment 200 may be included in the remote server 105 and/or the endpoint device 125.

The processing unit 202 may control one or more of the memory unit 204, the I/O unit 206, and the communication unit 208 of the computing environment 200, as well as any included subunits, elements, components, devices, and/or functions performed by the memory unit 204, I/O unit 206, and the communication unit 208. The described sub-elements of the computing environment 200 may also be included in similar fashion in any of the other units and/or devices included in the system 100 of FIG. 1. Additionally, any actions described herein as being performed by a processor may be taken by the processing unit 202 of FIG. 2 and/or FIG. 3 alone and/or by the processing unit 202 in conjunction with one or more additional processors, units, subunits, elements, components, devices, and/or the like. Further, while one processing unit 202 may be shown in FIG. 2 and/or FIG. 3, multiple processing units may be present and/or otherwise included in the computing environment 200 or elsewhere in the overall system (e.g., system 100 of FIG. 1). Thus, while instructions may be described as being executed by the processing unit 202 (and/or various subunits of the processing unit 202), the instructions may be executed simultaneously, serially, and/or otherwise by one or multiple processing units 202 on one or more devices.

In some embodiments, the processing unit 202 may be implemented as one or more computer processing unit (CPU) chips and/or graphical processing unit (GPU) chips and may include a hardware device capable of executing computer instructions. The processing unit 202 may execute instructions, codes, computer programs, and/or scripts. The instructions, codes, computer programs, and/or scripts may be received from and/or stored in the memory unit 204, the I/O unit 206, the communication unit 208, subunits, and/or elements of the aforementioned units, other devices, and/or computing environments, and/or the like.

In some embodiments, the processing unit 202 may include, among other elements, subunits such as a content management unit 212, a location determination unit 214, a graphical processing unit (GPU) 216, and a resource allocation unit 218. Each of the aforementioned subunits of the processing unit 202 may be communicatively and/or otherwise operably coupled with each other.

The content management unit 212 may facilitate generation, modification, analysis, transmission, and/or presentation of content. Content may be file content, media content, malware content, or any combination thereof. In some instances, Content on which the content management unit 212 may operate includes device information, user interface data, images, text, themes, audio files, video files, documents, and/or the like. Additionally, the content management unit 212 may control the audio-visual environment and/or appearance of application data during execution of various processes (e.g., via web GUI 170 at the endpoint device 125). In some embodiments, the content management unit 212 may interface with a third-party content server and/or memory location for execution of its operations.

The location determination unit 214 may facilitate detection, generation, modification, analysis, transmission, and/or presentation of location information. Location information may include global positioning system (GPS) coordinates, an Internet protocol (IP) address, a media access control (MAC) address, geolocation information, a port number, a server number, a proxy name and/or number, device information (e.g., a serial number), an address, a zip code, and/or the like. In some embodiments, the location determination unit 214 may include various sensors, radar, and/or other specifically-purposed hardware elements for the location determination unit 214 to acquire, measure, and/or otherwise transform location information.

The GPU 216 may facilitate generation, modification, analysis, processing, transmission, and/or presentation of content described above, as well as any data (e.g., scanning instructions, scan data, and/or the like) described herein. In some embodiments, the GPU 216 may be utilized to render content for presentation on a computing device (e.g., via web GUI 170 at the endpoint device 125). The GPU 216 may also include multiple GPUs and therefore may be configured to perform and/or execute multiple processes in parallel. In some implementations, the GPU 216 may be used in conjunction with the threat detection unit 234, the scan history unit 236, and/or other subunits associated with the memory unit 204, the I/O unit 206, the communication unit 208, and/or a combination thereof.

The resource allocation unit 218 may facilitate the determination, monitoring, analysis, and/or allocation of computing resources throughout the computing environment 200 and/or other computing environments. For example, the computing environment may facilitate a high volume of data (e.g., files, malware, malware variants, etc.), to be processed and analyzed. As such, computing resources of the computing environment 200 utilized by the processing unit 202, the memory unit 204, the I/O unit 206, and/or the communication unit 208 (and/or any subunit of the aforementioned units) such as processing power, data storage space, network bandwidth, and/or the like may be in high demand at various times during operation. Accordingly, the resource allocation unit 218 may include sensors and/or other specially-purposed hardware for monitoring performance of each unit and/or subunit of the computing environment 200, as well as hardware for responding to the computing resource needs of each unit and/or subunit. In some embodiments, the resource allocation unit 218 may utilize computing resources of a second computing environment separate and distinct from the computing environment 200 to facilitate a desired operation.

For example, the resource allocation unit 218 may determine a number of simultaneous computing processes and/or requests. The resource allocation unit 218 may also determine that the number of simultaneous computing processes and/or requests meets and/or exceeds a predetermined threshold value. Based on this determination, the resource allocation unit 218 may determine an amount of additional computing resources (e.g., processing power, storage space of a particular non-transitory computer-readable memory medium, network bandwidth, and/or the like) required by the processing unit 202, the memory unit 204, the I/O unit 206, the communication unit 208, and/or any subunit of the aforementioned units for safe and efficient operation of the computing environment while supporting the number of simultaneous computing processes and/or requests. The resource allocation unit 218 may then retrieve, transmit, control, allocate, and/or otherwise distribute determined amount(s) of computing resources to each element (e.g., unit and/or subunit) of the computing environment 200 and/or another computing environment.

In some embodiments, factors affecting the allocation of computing resources by the resource allocation unit 218 may include the number of computing processes and/or requests, a duration of time during which computing resources are required by one or more elements of the computing environment 200, and/or the like. In some implementations, computing resources may be allocated to and/or distributed amongst a plurality of second computing environments included in the computing environment 200 based on one or more factors mentioned above. In some embodiments, the allocation of computing resources of the resource allocation unit 218 may include the resource allocation unit 218 flipping a switch, adjusting processing power, adjusting memory size, partitioning a memory element, transmitting data, controlling one or more input and/or output devices, modifying various communication protocols, and/or the like. In some embodiments, the resource allocation unit 218 may facilitate utilization of parallel processing techniques such as dedicating a plurality of GPUs included in the processing unit 202 for running a multitude of processes.

The memory unit 204 may be utilized for storing, recalling, receiving, transmitting, and/or accessing various files and/or data (e.g., malware files, malware samples, scan data, and/or the like) during operation of computing environment 200. For example, memory unit 204 may be utilized for storing, recalling, and/or updating scan history information as well as other data associated with, resulting from, and/or generated by any unit, or combination of units and/or subunits of the computing environment 200. In some embodiments, the memory unit 204 may store instructions, code, and/or data that may be executed by the processing unit 201. For instance, the memory unit 204 may store code that execute operations associated with one or more units and/or one or more subunits of the computing environment 200. For example, the memory unit may store code for the processing unit 202, the I/O unit 206, the communication unit 208, and for itself.

Memory unit 204 may include various types of data storage media such as solid state storage media, hard disk storage media, virtual storage media, and/or the like. Memory unit 204 may include dedicated hardware elements such as hard drives and/or servers, as well as software elements such as cloud-based storage drives. In some implementations, memory unit 204 may be a random access memory (RAM) device, a dynamic random access memory (DRAM) device, a static random access memory (SRAM) device, flash memory, read only memory (ROM) device, and/or various forms of secondary storage. The RAM device may be used to store volatile data and/or to store instructions that may be executed by the processing unit 202. For example, the instructions stored by the RAM device may be a command, a current operating state of computing environment 200, an intended operating state of computing environment 200, and/or the like. As a further example, data stored in the RAM device of memory unit 204 may include instructions related to various methods and/or functionalities described herein. The ROM device may be a non-volatile memory device that may have a smaller memory capacity than the memory capacity of a secondary storage. The ROM device may be used to store instructions and/or data that may be read during execution of computer instructions. In some embodiments, access to both the RAM device and ROM device may be faster to access than the secondary storage.

Secondary storage may comprise one or more disk drives and/or tape drives and may be used for non-volatile storage of data or as an over-flow data storage device if the RAM device is not large enough to hold all working data. Secondary storage may be used to store programs that may be loaded into the RAM device when such programs are selected for execution. In some embodiments, the memory unit 204 may include one or more databases 310 (shown in FIG. 3) for storing any data described herein. For example, depending on the implementation, the one or more databases may be used as the local record repository 103 of the endpoint device discussed with reference to FIG. 1. Additionally or alternatively, one or more secondary databases (e.g., the public record repository 113 discussed with reference to FIG. 1) located remotely from computing environment 200 may be utilized and/or accessed by memory unit 204. In some embodiments, memory unit 204 and/or its subunits may be local to the remote server 105 and/or the endpoint device 125 and/or remotely located in relation to the remote server 105 and/or the endpoint device 125.

Turning back to FIG. 2, the memory unit 204 may include subunits such as an operating system unit 226, an application data unit 228, an application programming interface 230, a content storage unit 232, security infrastructure 140, and a cache storage unit 240. Each of the aforementioned subunits of the memory unit 204 may be communicatively and/or otherwise operably coupled with each other and other units and/or subunits of the computing environment 200. It is also noted that the memory unit 204 may include other modules, instructions, or code that facilitate the execution of the techniques described herein. For instance, the memory unit 204 may include one or more modules such as a receiving module, a mapping module, a determining module, a sequencing module, a parsing module, a visualization module, etc., that comprise instructions executable by one or more computing device processors to accomplish the steps in the flowcharts of FIG. 4 and FIG. 5.

The operating system unit 226 may facilitate deployment, storage, access, execution, and/or utilization of an operating system utilized by computing environment 200 and/or any other computing environment described herein. In some embodiments, operating system unit 226 may include various hardware and/or software elements that serve as a structural framework for processing unit 202 to execute various operations described herein. Operating system unit 226 may further store various pieces of information and/or data associated with the operation of the operating system and/or computing environment 200 as a whole, such as a status of computing resources (e.g., processing power, memory availability, resource utilization, and/or the like), runtime information, modules to direct execution of operations described herein, user permissions, security credentials, and/or the like.

The application data unit 228 may facilitate deployment, storage, access, execution, and/or utilization of an application utilized by computing environment 200 and/or any other computing environment described herein. For example, the endpoint device 125 may be required to download, install, access, and/or otherwise utilize a software application (e.g., web application 165) to facilitate performance of malware scanning operations and/or kill chain graph generation and/or asset remediation trend map generation as described herein. As such, application data unit 228 may store any information and/or data associated with an application. Application data unit 228 may further store various pieces of information and/or data associated with the operation of an application and/or computing environment 200 as a whole, such as a status of computing resources (e.g., processing power, memory availability, resource utilization, and/or the like), runtime information, user interfaces, modules to direct execution of operations described herein, user permissions, security credentials, and/or the like.

The application programming interface (API) unit 230 may facilitate deployment, storage, access, execution, and/or utilization of information associated with APIs of computing environment 200 and/or any other computing environment described herein. For example, computing environment 200 may include one or more APIs for various devices, applications, units, subunits, elements, and/or other computing environments to communicate with each other and/or utilize the same data. Accordingly, API unit 230 may include API databases containing information that may be accessed and/or utilized by applications, units, subunits, elements, and/or operating systems of other devices and/or computing environments. In some embodiments, each API database may be associated with a customized physical circuit included in memory unit 204 and/or API unit 230. Additionally, each API database may be public and/or private, and so authentication credentials may be required to access information in an API database. In some embodiments, the API unit 230 may enable the remote server 105 and the endpoint device 125 to communicate with each other.

The content storage unit 232 may facilitate deployment, storage, access, and/or utilization of information associated with performance of malware scanning operations and/or framework processes by computing environment 200 and/or any other computing environment described herein. In some embodiments, content storage unit 232 may communicate with content management unit 212 to receive and/or transmit content files (e.g., media content).

Security infrastructure 140 may include at least a threat detection unit 234 and a scan history unit 236. The threat detection unit 234 may store instructions associated with one or more security products of security infrastructure 140 that facilitate the detection of threats posed by threat actors. For example, the threat detection unit may store instructions associated with access control software, anti-keyloggers, anti-malware, anti-spyware, anti-subversion software, anti-tamper software, antivirus software, cryptographic software, computer-aided dispatch (CAD), Firewall (web or otherwise), Intrusion detection systems (IDS), Intrusion prevention systems (IPS), log management software, records management software, Sandboxes (e.g., a secure environment in which various computing processes may be executed), security information management, security information and event management (SIEM) software, anti-theft software, parental control software, cloud-based security protection, and/or the like.

The scan history unit 236 may facilitate deployment, storage, access, analysis, and/or utilization of scan data received during a scan of the endpoint device 125. For example, scan history unit 236 may store information associated with each operation that involves file scanning, malware file execution, malware detection, and or the other operations executed by security products of security infrastructure 140. Information stored in scan history unit 236 may be utilized by the content management unit 212, GPU unit 216, threat detection unit 222, and/or other units and/or subunits of computing environment 200. It should be understood that information generated by or associated with the threat detection unit 234 and/or scan history unit 236 may be stored in the local record repository 103 and/or the public record repository.

The cache storage unit 240 tray facilitate short-term deployment, storage, access, analysis, and/or utilization of data. In some embodiments, cache storage unit 240 may serve as a short-term storage location for data so that the data stored in cache storage unit 240 may be accessed quickly. In some instances, cache storage unit 240 may include RAM devices and/or other storage media types for quick recall of stored data. Cache storage unit 240 may include a partitioned portion of storage media included in memory unit 204.

The I/O unit 206 may include hardware and/or software elements for the computing environment 200 to receive, transmit, and/or present information useful for performing malware scanning operations and/or other processes as described herein. For example, elements of the I/O unit 206 may be used to receive input from a user of the endpoint device 125. As described herein, I/O unit 206 may include subunits such as al I/O device 242, an I/O calibration unit 244, and/or driver 246.

The I/O device 242 may facilitate the receipt, transmission, processing, presentation, display, input, and/or output of information as a result of executed processes described herein. In some embodiments, the I/O device 242 may include a plurality of I/O devices. In some embodiments, I/O device 242 may include a variety of elements that enable a user to interface with computing environment 200. For example, I/O device 242 may include a keyboard, a touchscreen, a button, a sensor, a biometric scanner, a laser, a microphone, a camera, and/or another element for receiving and/or collecting input from a user. Additionally and/or alternatively, I/O device 242 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 242 may communicate with one or more elements of processing unit 202 and/or memory unit 204 to execute operations associated with malware scanning, detection, displaying visual representations of attack steps used in attack campaigns associated with the malware scanning and detections, displaying visual representations of remediation strategies against an attack campaign, and other operations described herein.

The I/O calibration unit 244 may facilitate the calibration of the I/O device 242. For example, I/O calibration unit 244 may detect and/or determine one or more settings of I/O device 242, and then adjust and/or modify settings so that the I/O device 242 may operate more efficiently.

In some embodiments, I/O calibration unit 244 may utilize a driver 246 (or multiple drivers) to calibrate I/O device 242. For example, driver 246 may include software that is to be installed by I/O calibration unit 244 so that an element of computing environment 200 (or an element of another computing environment) may recognize and/or integrate with I/O device 242 for the malware scanning operations and/or framework processes described herein.

The communication unit 208 may facilitate establishment, maintenance, monitoring, and/or termination of communications between computing environment 200 and other computing environments, third party server systems, and/or the like (e.g., between the remote server 105 and the endpoint device 125). Communication unit 208 may also facilitate internal communications between various elements (e.g., units and/or subunits) of computing environment 200. In some embodiments, communication unit 208 may include a network protocol unit 248, an API gateway 250, an encryption engine 252, and/or a communication device 254. Communication unit 208 may include hardware and/or software elements.

The network protocol unit 248 may facilitate establishment, maintenance, and/or termination of a communication connection for computing environment 200 by way of a network. For example, network protocol unit 248 may detect and/or define a communication protocol required by a particular network and/or network type. Communication protocols utilized by network protocol unit 248 may include Wi-Fi protocols, Li-Fi protocols, cellular data network protocols, Bluetooth® protocols, WiMAX protocols, Ethernet protocols, powerline communication (PLC) protocols, and/or the like. In some embodiments, facilitation of communication for computing environment 200 may include transforming and/or translating data from being compatible with a first communication protocol to being compatible with a second communication protocol. In some embodiments, network protocol unit 248 may determine and/or monitor an amount of data traffic to consequently determine which particular network protocol is to be used for establishing a secure communication connection, transmitting data, and/or performing malware scanning operations and/or other processes described herein.

The application programming interface (API) gateway 250 may facilitate other devices and/or computing environments to access API unit 230 of memory unit 204 of computing environment 200. For example, an endpoint device 125 may access API unit 230 of computing environment 200 via API gateway 250. In some embodiments, API gateway 250 may be required to validate user credentials associated with a user of an endpoint device prior to providing access to API unit 230 to a user. API gateway 250 may include instructions for computing environment 200 to communicate with another device and/or between elements of the computing environment 200.

The encryption engine 252 may facilitate translation, encryption, encoding, decryption, and/or decoding of information received, transmitted, and/or stored by the computing environment 200. Using encryption engine 252, each transmission of data may be encrypted, encoded, and/or translated for security reasons, and any received data may be encrypted, encoded, and/or translated prior to its processing and/or storage. In some embodiments, encryption engine 252 may generate an encryption key, an encoding key, a translation key, and/or the like, which may be transmitted along with any data content.

The communication device 254 may include a variety of hardware and/or software specifically purposed to facilitate communication for computing environment 200. In some embodiments, communication device 254 may include one or more radio transceivers, chips, analog front end (AFE) units, antennas, processing units, memory, other logic, and/or other components to implement communication protocols (wired or wireless) and related functionality for facilitating communication for computing environment 200. Additionally and/or alternatively, communication device 254 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

Attack Kill Chain Generation

FIG. 4 shows an example flowchart 400 for generating an attack kill chain in accordance with some embodiments of this disclosure. At block 402, one or more computing device processors (e.g., processing unit 202) may receive a first security event captured by a first security operation associated with a computing device, and a second security event captured by a second security operation associated with the computing device. For example, the first security event and/or the second security event may be received using one or more computing device processors associated with the end point device 125 and/or other computing device processors coupled to the network 110 of FIG. 1. In one embodiment, the one or more computing device processors may execute instructions associated with/or in cooperation with security infrastructure 140 to capture the first security event and/or the second security event using one or more of the security infrastructure's security products or some other security software or application running on a computing system. The captured first security event and second security event may be logged into a database (e.g., local record repository 103, public record repository 113, etc.) by the one or more computing device processors. For instance, the security infrastructure 140 may capture the first security event and/or the second security event following which the first security event and the second security event are logged/recorded into a log such as an antivirus log, a web application firewall log, an intrusion prevention system log, an intrusion detection system log, a web server log, an operating system log, etc. In some implementations, other data, other than the security event can be recorded in association with each security event. This data could include, among other things, a time stamp for each recorded security event, one or more identifiers for each security event, specific assets (i.e., hardware and/or software resources) of the computing device associated with the security event, etc.

In some implementations, the first security event and/or the second security event may comprise security events associated with: infrastructure security operations such as data center security operations; cloud security operations including real-time protection of cloud data; compliance security operations including monitoring and managing third parties using data associated with a centralized computing device (e.g., endpoint device 125, remote server 105, etc.); network security operations such as discovering, tracking and protecting assets coupled to a network associated with the computing device; DevOps operations such as flagging intrusions associated with software development and information technology operations; etc. In some implementations, the first security event may comprise a passive attack event comprising one or more security detections of reconnaissance activity to obtain vulnerability information of a computing device/system. The second se purity event may comprise one or more security detections associated with intrusion activity on the computing device. Intrusion activity may include any malicious activity and/or any violation of policy associated with assets of the computing device.

In other embodiments, the first security event and/or the second security event may be associated with, or tied to physical structures such as buildings, rooms, offices, labs, or the like, within which is a computing device or computing system, and/or a computing network linked to the first security event and/or the second security event. In such cases, the computing device, the computing system, and/or the computing network associated with the first security event, and/or the second security event can be directly accessed by an individual who gains physical access to the physical structures in question. For example, the first security event and/or the second security event may be traced back to a specific computing device within a specific physical structure.

In some implementations, the specific physical structure include access control mechanisms for tracking access to the physical structures in question, and/or for recording/logging identities of individuals gaining access to the physical structures in question, and/or for detecting unauthorized access to the physical structures in question, and/or for preventing physical access to physical structures in question. For example, the access control mechanisms could include an Identity and Access Management system comprising security policies and tools that allow the right people access to the right resources for the right reasons at the right time within a physical structure. In other embodiments, the access control mechanism includes a card reader for capturing identities of individuals with access cards/badges to the physical structure in question. Other access control mechanisms include elevator readers, intrusion detectors, magnetic stripe readers, eCard Access control systems, Master Readers, QR code access readers, alarm systems, biometric access readers, etc., that are associated with the physical structures in question.

One of the properties of the above mentioned access control mechanisms is their ability to log events associated with access to the physical structures. In one embodiment, the logs generated by at least one or more access control mechanisms are correlated or associated with the first security event and/or the second security event. For instance, if a particular card reader logs the identity of a fake or legitimate individual who gains access to a particular room and executes operations on a computing device within the particular room at a particular time, those operations executed on the computing device can result in the occurrence of the first security event and/or the second security event. As such the access gained to the particular room can be a factor that led to the first security event and/or the second security event occurring in the first place. Consequently, the logged access to the particular room can be associated with the first security event and/or the second security event and plays a role in the subsequent analysis of the first security event and/or the second security event. In some implementations, the kill chain (which is discussed below) generated based on the first security event and/or the second security event associated with a logged access to a physical location can indicate that the physical access to the location in question is a vulnerability that needs to be addressed. Similarly, an asset remediation trend map (also discussed below) may include strategies for addressing such vulnerabilities.

Turning back to block 404 of flowchart 400, one or more computing device processors may map the first security event to first security data in an attack repository, and the second security event to second security data in the attack repository. In some implementations, the attack repository may comprise attack data captured from multiple computing devices associated with different entities. For example, the attack repository may comprise the public record repository 113 shown in FIG. 1. The mapping performed may, for example be facilitated by data imbedded in the log of each first security event and each second security event. For instance, the one or more computing device processors may leverage one or more identifiers stored in association with each first security event and each second security event in executing the mapping. The one or more identifiers for each first security event and/or each second security event may be generated based on a security event assessment tool such as a machine learning feature of the security infrastructure 140 that assesses contextual information and/or other data associated with how the first security event and/or the second security event occurred in the first place.

Returning to flowchart 400, one or more computing device processors, may at block 406, determine based on the mapping, one or more attack execution operations for executing the attack campaign associated with the first security event and the second security event. In some embodiments, the one or more attack execution operations may correspond to tactics, and/or techniques, and/or practices used to execute the first security event and the second security event. At block 408, the one or more computing device processors may combine (e.g., sequence) the one or more attack execution operations to form an attack kill chain. The attack kill chain may provide an ordered indication of the one or more attack execution operations for executing the attack campaign associated with the first security event and the second security event. This ordered indication, in some implementations, can be based on when the first security event occurred relative to the second security event, how the first security event relates to the second security event, etc. In essence, the ordering of the attack execution operations can provide information such as a progression of attack execution operations associated with the attack campaign, what system conditions made the attack campaign successful, and what attack execution steps constitute the attack campaign. Thus, the first security event and the second security event can be translated into the one or more attack execution operations of the kill chain associated with the attack campaign. The kill chain generated can be stored in the memory unit 204 or some other storage media and can advantageously provide a holistic view of the attack campaign. The generated kill chain can be used to enable real-time or pseudo-real-time remediation of the attack campaign.

At block 410, the one or more computing device processors, may initiate generation of a visual representation of the attack kill chain. This visual representation may in some embodiments indicate a sequence of the one or more attack execution operations for executing the attack campaign associated with the first security event and the second security event. For instance, the visual representation may comprise one or more vertices representing the one or more attack execution operations. The one or more vertices can be organized to reflect an order of occurrence of the one or more attack execution operations associated with the first security event and/or the second security event. In some implementations, the visual representation may further indicate a specific threat-actor, a specific software and/or hardware used to execute the attack campaign. For example the specific threat factor could be a hacker or an ATP group while the specific software used in the attack campaign could be a malware such as Drupalgeddon, Mimikatz, 3PARA RAT, Android Overlay Malware, Calisto, CloudDuke, Downdelph, DroidJack, gh0st, MobileOrder, and other commercial code, operating system utilities, and other open-source software.

Asset Remediation Trend Map Generation

Figure 5:
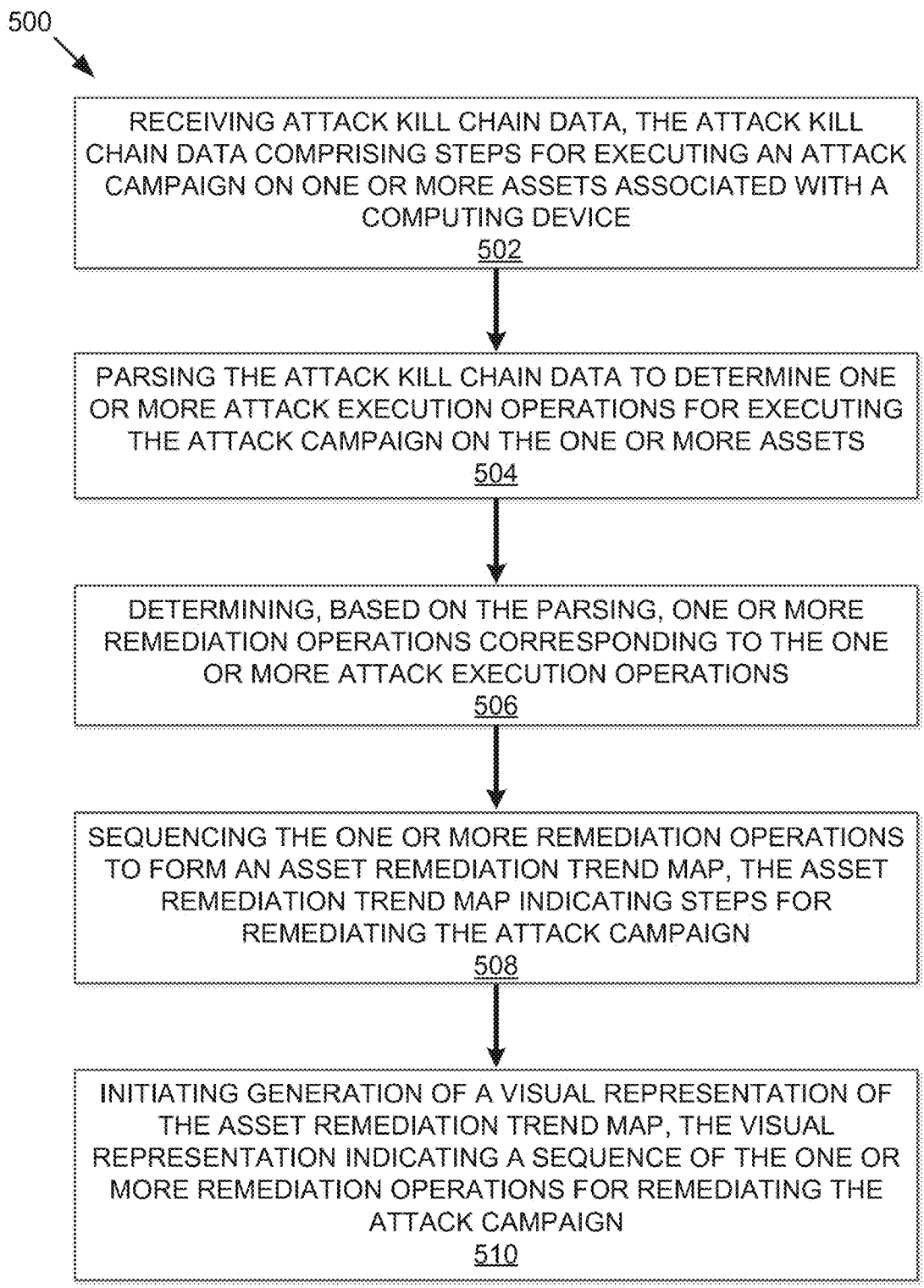
FIG. 5 shows an example flowchart for generating an asset remediation trend map in accordance with some embodiments of this disclosure.

FIG. 5 shows an example flowchart 500 for generating an asset remediation trend map in accordance with some embodiments of this disclosure. At block 502, one or more computing device processors may receive attack kill chain data comprising steps for executing an attack campaign on one or more assets associated with a computing device. For instance, processing unit 202 may receive an attack kill chain data from memory unit 204. Following this, the processing unit 202 may parse the attack kill chain data to determine one or more attack execution operations for executing the attack campaign on the one or more assets associated with the computing device. As noted above, the one or assets could include hardware and/or a software resource of a computing device. In some implementations, resources could include data, files, memory, etc., associated with the computing device. Parsing the attack kill chain data in some embodiments, includes at least: determining successful attack execution operations within one or more attack execution operations associated with the attack kill chain data. Additionally, parsing the attack kill chain data could also include: quantifying successful attack execution operations to determine a criticality of successful attack execution operations; and determining, based on the quantifying, corresponding remediation operations. Each corresponding remediation operation can account for a criticality associated with corresponding quantified successful attack execution operation. In some implementations, the quantifying of successful attack execution operations may include: assigning a weight to each successful attack execution operation of the one or more attack execution operations; and calculating a metric score for each weighted successful attack execution operation. The metric score for each weighted successful attack execution operation can indicate the criticality of said attack execution operation.

In some implementations, the quantifying may be based on one or more criteria such as: a locational vulnerability assessment including one of a local vulnerability assessment and a remote vulnerability assessment; patch availability for each successful attack execution operation; and a remediation type. Remediation type may include an antivirus remediation; firewall remediation; operating system remediation; domain remediation; and an access policy remediation. In particular, the one or more computing device processors may assess any successful attack execution operation to determine which remediation type would be appropriate to, for example, prevent, resolve, or otherwise address one or more successful attack execution operations determined from the parsing.

At block 506, the one or more computing device processors may determine based on the parsing, one or more remediation operations corresponding to the determined one or more attack execution operations. For instance, the quantifying step described above could indicate at least a remediation operation for each determined attack execution operation. At block 508, the one or more computing device processors may sequence the one or more remediation operations to form an asset remediation trend map. The asset remediation trend map may indicate steps for remediating the attack campaign associated with the one or more assets. In some implementations, these steps may include using one or more features of the security infrastructure 140 based on the remediation type. In other embodiments, the steps for remediating the attack campaign may include using computer security features and techniques not included in security infrastructure 140 based on the remediation type. In some instances, the steps for remediating the attack campaign may include a combination of computer security features and/or products associated with security infrastructure 140, some other computer security features/products external to security infrastructure 140, and/or methodologies external to security infrastructure 140, a modification of the security products/techniques comprised in or external to security infrastructure 140, etc.

At block 510, the one or more computing device processor may initiate the generation of a visual representation of the asset remediation trend map. The visual representation may indicate a sequence of one or more remediation operations for remediating the attack campaign associated with the one or more assets. In some embodiments, the visual representation may comprise one or more vertices representing the one or more remediation operations. In some implementations, the one or more vertices can be organized to reflect an order of execution for the one or more remediation operations. The visual representation generated of the asset remediation trend map can provide insight into what specific remediation steps were executed, what order of execution of the remediation steps is most effective in addressing the attack campaign, whether the remediation steps need to be revised or other changed based on subsequent iterations of the flowchart 500. In some implementations, the visual indication of the asset remediation trend map may have one or more indicators that reflect: a status of one or more remediation operations; a progression of the one or more remediation operations; etc.

Example Implementations

Figure 6:
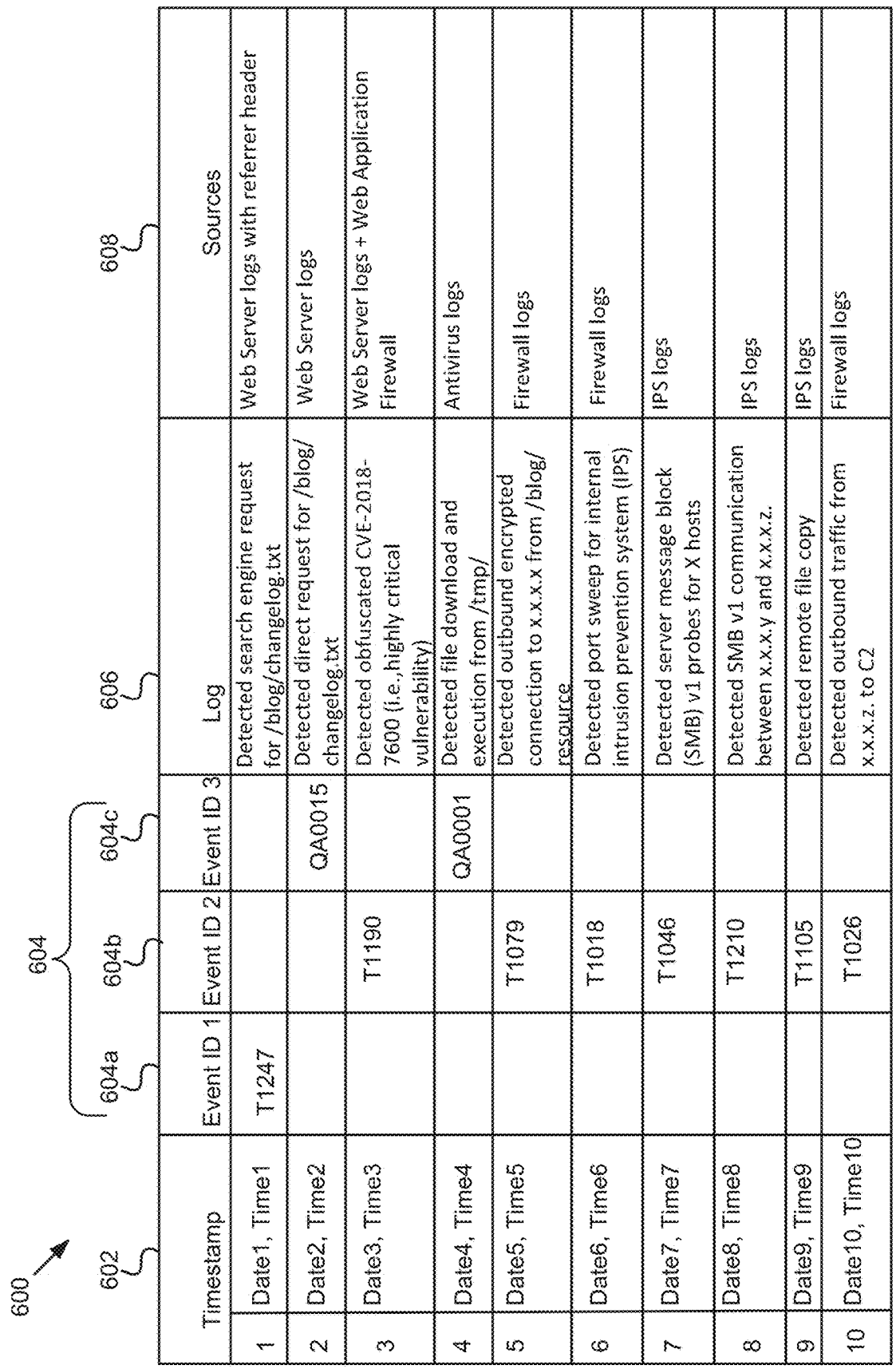
FIG. 6 shows an example computer security record associated with a computing device in accordance with some embodiments of this disclosure.

FIG. 6 shows an example computer security record 600 associated with a computing device in accordance with some embodiments of this disclosure. As discussed above with reference to security infrastructure 140, one or more security products or the like may detect one or more security events associated with an asset of the computing device/system. As shown in the figure, a plurality of security events are logged into the computer security record 600 from different sources at different times. In some embodiments, one or more computing device processors may aggregate the computer security record 600 already logged by multiple different security products from different sources. The computer security record 600 shows a plurality of data columns such as timestamp 602, one or more event IDs 604, events/logs 606, and sources 608 from which the events/logs were captured. For each timestamp in the computer security record, a specific Identifier (ID) may be generated as previously discussed. Each event ID can be associated with a specific log/event and logged by the computer security product at a particular source.

As an example, one or more computing device processors may execute instructions that aggregate from a plurality of sources 608, one or more security events 606 associated with a computing resource (e.g., software, files, hardware, etc. of a computing device). As part of the aggregation, one or more event IDs 604 may be generated based on contextual information about a particular logged detection. Contextual information may include a combination of assessments comprising: what type of security detection does the logged event fall under?; what tools (e.g., security products) were used to detect the logged event?; on what computing device was the security event detected?; what was the motive behind the security breach/attack associated with the security event?; was the security attack associated with the security event successful or unsuccessful?; was the security attack a passive attack or an active attack?; how many times did the security attack associated with a given security event occur?; etc. In some implementations, contextual information may be determined using machine learning or artificial intelligence tools that assess a plurality of contextual information overtime in order to know what event IDs to associate with security events. It is noted that multiple different event IDs belonging to multiple different event ID groups may be generated in some implementations. For instance, event IDs 604a, 604b, and 604c correspond to different event ID groups. Thus, event ID T1247 belongs event ID group "Event ID 1", which is different from event ID QA0015 which belongs to event ID group "Event ID 3". Similarly, event ID T1190 generated at timestamp 3 is belongs to event ID group "Event ID 2" which is different from event ID groups "Event ID 1" and "Event ID 3".

FIG. 7 shows an example mapping 700 of the detected security events to attack execution operations in an attack repository, in accordance with some embodiments of this disclosure. As shown in the figure, attack execution operations may be grouped under the plurality of tactics 702, 704, 706, 708, 710, 712, 714, 716, 718, 720, and 722. In particular, each tactic column may have a plurality of rows with each row corresponding to techniques and/or practices aligned to a particular phase within an attack kill chain. It should be understood that there can be more or less tactics than those shown in FIG. 7 based on properties such as the framework of the attack repository, or how the data in the attack repository is structured to facilitate the mapping. In some implementations, the various event ID groups discussed above could be based on the framework on which the attack repository was built. For example, event ID group "Event ID 2" (see FIG. 6) has its elements mapped to the attack repository (e.g., MITRE ATT&CK framework) shown in FIG. 7 whiles there is no mapping shown for event IDs associated with event ID groups "Event ID 1" and "Event ID 3", although event ID groups "Event ID 1" and "Event ID 3" may be mapped to a different attack repository according to some embodiments. Based on what the event IDs correspond to after the mapping, one or more attack execution operations (i.e. attack techniques, and/or tactics, and/or practices) associated with relevant logged events can be generated and combined into an attack kill chain as discussed below.

Figure 8:
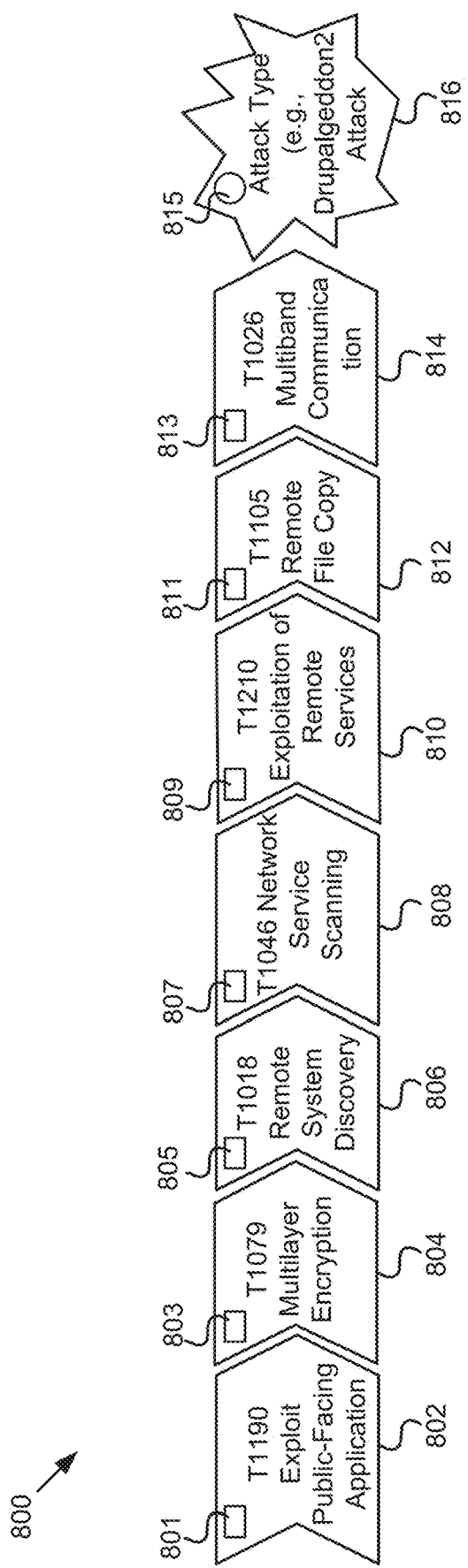
FIG. 8 shows an example attack kill chain, in accordance with some embodiments of this disclosure.

FIG. 8 is an example comb; nation and visualization 800 of one or more attack execution operation into an attack kill chain, in accordance with some embodiments of this disclosure. As seen in the figure, each of the attack execution operations resulting from the mapping are shown in attack kill chain blocks 802, 804, 806, 808, 810, 812, and 814. In some embodiments, the various attack kill chain blocks may be sequentially arranged based on an order of occurrence of the security events in computer security record 600. Additionally, and in some embodiments, a machine learning or artificial intelligence tool, or some other computational tool may be executed by one or more computing device processors to evaluate the sequence of attack kill chain blocks to determine: whether a specific attack tool (e.g., malware such as Drupalgeddon2, Mimikatz, etc.) was used to execute the attack campaign; whether the ordered attack kill chain blocks are illustrative of an attack signature of a particular attack group (e.g., APT groups, other hackers, etc.); etc. For example, the ordered attack kill chain blocks shown in FIG. 8 are illustrative of a Drupalgeddon2 attack shown in the attack campaign evaluation result 816.

Also shown in association with each attack kill chain block is at least one indicator. For example, the indicators 801, 803, 805, 807, 809, 811, and 813 respectively correspond to attack kill chain blocks 802, 804, 806, 808, 810, 812, and 814. Additionally, the attack campaign evaluation result 816 may also have at least one indicator. The one or more indicators in some implementations may indicate a status of an attack execution operation during the execution of remediation methodologies against the attack kill chain. For instance, and as discussed below, each successful remediation operation could cause one or more computing device processors to activate and/or deactivate an indicator associated with either the attack kill chain blocks and/or the attack campaign evaluation result.

Using the Drupalgeddon2 example above from the attack kill chain data associated with FIG. 6, FIG. 7, and FIG. 8, the attack kill chain data associated with visualization 800 can be parsed by one or more computing device processors to determine successful attack execution operations associated with Identifiers T1247, QA0015, T1190, QA0001, T1079, T1018, T1046, T1210, T1105, T1026. Remediation for each of the successful attack execution operations must be applied to stop the attack kill chain. This may involve quantifying each successful attack execution operation and determining a remediation operation based the quantifying. In one embodiment, one or more computing device processors may assign weights to the successful attack execution operations as part of the quantifying. A metric score for each successful attack execution operation may then be calculated by the one or more computing device processors. In some embodiments, each attack execution operation (successful or otherwise) and its score can be visualized to determine a criticality of each attack execution operation. The visualization showing the criticality of each attack execution operation may facilitate the design and execution of optimal remediation operations/strategies. In some implementations, an asset remediation trend map may be generated based on the visualization showing the criticality of each attack execution operation and the remediation operations used to address the attack execution operations.

For example, the one or more attack execution operations associated with identifiers T1247, QA0015, T1190, QA0001, T1079, T1018, T1046, T1210, T1105, and T1026 shown in the computer security record 600 may be assessed by one or more computing device processors to determine a criticality level. This assessment may include, in some embodiments, quantifying the criticality associated with the attack execution operations. For example, the one or more computing device processors may assign scores indicative of the criticality level of the attack execution operations. In one embodiment, the scores may be assigned based on the following conditions/criteria: scores must be assigned in the range of 0-5 for each condition; conditions may include tests on each attack execution operation. For example, the tests can be based on the pseudocode below:

I. "Is an exploit associated with a given attack execution operation location dependent?"
   "If yes, assign a +5 weight to the given attack execution operation if said attack execution operation is subject to a remote vulnerability" OR
   "If yes, assign a +4 weight to the given attack execution operation if said attack execution operation is subject to a local vulnerability."

II. "Is a patch available for the given attack execution operation?"
   "If yes, assign a +3 weight to the given attack execution operation."

III. "What is the remediation dependent on?"
   "If remediation is dependent on antivirus (AV), intrusion prevention systems (IPS) or firewalls (FW) or the like, assign a +2 to the given attack execution operation."
   "If remediation is dependent on operation system modifications, domain modifications, access policy changes associated with the assets on which the given attack execution operation were executed, assign a +3 to the given attack execution operation."

Applying the above criteria to the attack execution operations associated with FIG. 8, the following pseudocode can be executed by one or more computing device processors:

Attack execution operation associated with T1247:

I. "This attack execution operation neither a local or remote exploit." +0 is assigned since this is not an exploit to begin with.

II. "Patch is not available." +0 is assigned because this is not an exploit; as such patches won't be applicable.

III. "Remediation is dependent on IPS/FW. Additionally, polices can be enforced that help prevent Open-source intelligence (OSINT) data leakage." As such +3 may be assigned to the attack execution operation associated with T1247.

Attack execution operation associated with T1190:

I. "This attack execution operation is a remote exploit." +5 is assigned to this attack execution operation II. "Patch is available." +3 is assigned to this attack execution operation.

III. "Remediation is dependent on IPS/FW." +2 may be assigned this attack execution operation associated with T1190.

Thus, based on the foregoing, the attack execution operation(s) associated with T1247 and T1190 would respectively have scores +3 and +10. Thus, attack execution operation(s) associated with T1190 would have a high criticality level compared to attack execution operation(s) associated with T1247. Similarly, scores for QA0015, QA0001, T1079, T1018, T1046, T1210, T1105, and T1026 can be calculated and the criticality for QA0015, QA0001, T1079, T1018, T1046, T1210, T1105, and T1026 quantified by one or more computing device processors. The remediation operations associated with each quantified attack execution operation may factor the quantified criticalities of all successful attack execution operations into generating the asset remediation trend map. In some implementations, the asset remediation trend map may have one or more indicators that, for example, reflect the effectiveness of one or more remediation operations against the one or more quantified attack execution operations. In some embodiments, the one or more indicators may further reflect a progression of the one or more remediation operations in the asset remediation trend map.

This disclosure presents systems and methods for generating and presenting an attack kill chain and an asset remediation trend map. In the preceding description, for purposes of explanation, numerous specific details are set forth in order to provide a thorough understanding of the disclosure. It will be apparent, however, that the disclosure can be practiced without these specific details. In other instances, structures and devices have been shown in block diagram form in order to avoid obscuring the disclosure. For example, the present disclosure has been described in some implementations above with reference to interfaces and particular hardware. However, the present disclosure applies to any type of computing device that can receive data and commands, and any devices providing security services.

Reference in the specification to "one implementation" or "an implementation" means that a particular feature, structure, or characteristic described in connection with the implementation is included in at least one implementation of the disclosure. The appearances of the phrase "in one implementation" or "in some implementations" in various places in the specification are not necessarily all referring to the same implementation.

Some portions of the detailed descriptions above are presented in terms of algorithms, modules, and symbolic representations of operations on data bits within a computer memory. These algorithmic descriptions and representations are the means used by those skilled in data processing arts to most effectively convey the substance of their work to others skilled in the art.

The present disclosure also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosure can take the form of an entirely hardware implementation, an entirely software implementation or an implementation containing both hardware and software elements. In some implementations, the disclosure is implemented in software, which includes but is not limited to firmware, resident software, microcode, etc.

Furthermore, the disclosure can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

Finally, the foregoing description of the implementations of the present disclosure has been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Likewise, the particular naming and division of the modules, routines, features, attributes, methodologies and other aspects are not mandatory or significant, and the mechanisms that implement the present disclosure or its features may have different names, divisions and/or formats. Furthermore, the relevant art, the modules, routines, features, attributes, methodologies and other aspects of the present disclosure can be implemented as software, hardware, firmware or any combination of the three. Also, wherever a component, an example of which is a module, of the present disclosure is implemented as software, the component can be implemented as a standalone program, as part of a larger program, as a plurality of separate programs, as a statically or dynamically linked library, as a kernel loadable module, as a device driver, and/or in every and any other way known now or in the future in the art of computer programming. Additionally, the present disclosure is in no way limited to implementation in any specific programming language, or for any specific operating system or environment. Accordingly, the disclosure of the present disclosure is intended to be illustrative, but not limiting, of the scope of the present disclosure, which is set forth in the following claims.

This application incorporates by reference the entirety of application Ser. No. 16/384,560, titled "Asset Remediation Trend Map Generation and Utilization for Threat Mitigation" filed on Apr. 15, 2019, and application Ser. No. 16/384,535, titled "Domain-Specific Language for Threat-Actor Deception" filed on Apr. 15, 2019, and application Ser. No. 16/384,339, titled "Domain Specific Language for Defending Against a Threat-Actor and Adversarial Tactics, Techniques, and Procedures" filed on Apr. 15, 2019, and application Ser. No. 16/384,321, titled "Domain-Specific Language Simulant for Simulating a Threat-actor and Adversarial Tactics, Techniques, and Procedures" filed on Apr. 15, 2019.

What is claimed is:

1. A method comprising:
receiving, using one or more computing device processors,
a first security event captured by a first security operation associated with a computing device, and
a second security event captured by a second security operation associated with the computing device,
the first security event and the second security event being associated with an attack campaign;
determining, using the one or more computing device processors, a first identifier associated with the first security event;
determining, using the one or more computing device processors, a second identifier associated with the second security event;
mapping, using the one or more computing device processors, based on the first identifier, the first security event to first security data in an attack repository, the attack repository comprising attack data captured from multiple computing devices associated with different entities;
mapping, using the one or more computing device processors, based on the second identifier, the second security event to second security data in the attack repository;
determining, using the one or more computing device processors, based on the mapping, one or more attack execution operations for executing the attack campaign associated with the first security event and the second security event;
sequencing, using the one or more computing device processors, based on when the first security event occurred relative to the second security event, and based on a relationship between the first security event and the second security event, the one or more attack execution operations to form an attack kill chain, the attack kill chain indicating the one or more attack execution operations for executing the attack campaign associated with the first security event and the second security event;
initiating indication of a first system condition of the computing device resulting in the first security event associated with the computing device, and a second system condition of the computing device resulting in the second security event associated with the computing device; and
initiating generation of, using the one or more computing device processors, a visual representation of the attack kill chain, the visual representation indicating a sequence of the one or more attack execution operations for executing the attack campaign associated with the first security event and the second security event.

2. The method of claim 1, wherein the first security operation comprises one or more of:
an infrastructure security operation;
a cloud security operation;
a compliance operation;
a network security operation; and
a software development operation.

3. The method of claim 1, wherein the first security event comprises a passive attack event comprising one or more security detections of reconnaissance activity for obtaining vulnerability information of the computing device.

4. The method of claim 3, wherein the second security event is an active attack event comprising one or more security detections associated with intrusion activity on the computing device.

5. The method of claim 4, wherein the one or more attack execution operations are associated with the passive attack event and the active attack event.

6. The method of claim 1, wherein the first security event comprises a security event log of an asset associated with the computing device, the security event log comprising one or more of:
an antivirus log;
a web application firewall log; and
an intrusion prevention system log.

7. The method of claim 6, wherein the asset associated with the computing device comprises one or more of a hardware resource, and a software resource of the computing device.

8. The method of claim 1, wherein the attack repository is based on a public record repository framework.

9. The method of claim 1, wherein the visual representation comprises one or more vertices representing the one or more attack execution operations, the one or more vertices being organized to reflect an order of occurrence of the one or more attack execution operations within the attack campaign associated with the first security event and the second security event.

10. The method of claim 1, wherein the attack kill chain enables remediation of the attack campaign.

11. The method of claim 1, wherein the second security event comprises one or more security detections associated with intrusion activity on the computing device, wherein the intrusion activity comprises a violation of a policy associated with one or more assets of the computing device.

12. A computer program product comprising a non-transitory computer useable medium including a computer readable code, wherein the computer readable code when executed using one or more computing device processors, causes the one or more computing device processors to:
receive a first security event captured by a first security operation associated with a computing device, and a second security event captured by a second security operation associated with the computing device, the first security event and the second security event being associated with an attack campaign;
determine a first identifier associated with the first security event;
determine a second identifier associated with the second security event;
map, based on the first identifier, the first security event to first security data in an attack repository, the attack repository comprising attack data captured from multiple computing devices associated with different entities;
map, based on the second identifier, the second security event to second security data in the attack repository;
determine, based on the mapping, one or more attack execution operations for executing the attack campaign associated with the first security event and the second security event;
sequence the one or more attack execution operations to form an attack kill chain, based on when the first security event occurred relative to the second security event, and based on a relationship between the first security event and the second security event, the attack kill chain indicating the one or more attack execution operations for executing the attack campaign associated with the first security event and the second security event;
initiate indication of a first system condition of the computing device resulting in the first security event associated with the computing device, and a second system condition of the computing device resulting in the second security event associated with the computing device; and
initiate generation of a visual representation of the attack kill chain, the visual representation indicating a sequence of the one or more attack execution operations for executing the attack campaign associated with the first security event and the second security event.

13. The computer program product of claim 12, wherein the one or more attack execution operations are associated with a passive attack event and an active attack event.

14. The computer program product of claim 12, wherein the first security event comprises a security event log captured by an asset associated with the computing device, the security event log comprising one or more of:
an antivirus log;
a web application firewall log; and
an intrusion prevention system log.

15. The computer program product of claim 12, wherein the attack repository is based on a public record repository framework.

16. A system comprising:
one or more computing system processors; and
memory storing instructions that, when executed by the one or more computing system processors, causes the system to:
receive a first security event captured by a first security operation associated with a computing device, and a second security event captured by a second security operation associated with the computing device, the first security event and the second security event being associated with an attack campaign;
determine a first identifier associated with the first security event;
determine a second identifier associated with the second security event;
map, based on the first identifier, the first security event to first security data in an attack repository, the attack repository comprising attack data captured from multiple computing devices associated with different entities;
map, based on the second identifier, the second security event to second security data in the attack repository;
determine, based on the mapping, one or more attack execution operations for executing the attack campaign associated with the first security event or the second security event;
sequence the one or more attack execution operations to form an attack kill chain, based on when the first security event occurred relative to the second security event, the attack kill chain indicating the one or more attack execution operations for executing the attack campaign associated with the first security event and the second security event;

initiate indication of a first system condition of the computing device resulting in the first security event associated with the computing device, and a second system condition of the computing device resulting in the second security event associated with the computing device; and initiate generation of a visual representation of the attack kill chain, the visual representation indicating a sequence of the one or more attack execution operations for executing the attack campaign associated with the first security event and the second security event.

17. The system of claim 16, wherein the first security operation comprises one or more of:

an infrastructure security operation;
a cloud security operation;
a compliance operation;
a network security operation; and
a software development operation.

18. The system of claim 16, wherein the second security event comprises a security event log of an asset associated with the computing device, the security event log comprising one or more of:

an antivirus log;
a web application firewall log; and
an intrusion prevention system log.

19. The system of claim 18, wherein the asset associated with the computing device comprises one or more of a hardware resource, and a software resource of the computing device.

20. The system of claim 16, wherein the visual representation comprises one or more vertices representing the one or more attack execution operations, the one or more vertices being organized to reflect an order of occurrence of the one or more attack execution operations within the attack campaign associated with the first security event and the second security event.

* * * * *